United States Patent
Son et al.

(10) Patent No.: US 8,710,384 B2
(45) Date of Patent: Apr. 29, 2014

(54) MULTIFUNCTION SWITCH FOR VEHICLE HAVING LIGHTING MODULE

(75) Inventors: Who Guen Son, Gyeonggi-do (KR);
Jung Kuean Kim, Gyeonggi-do (KR);
Seong Ho Park, Seoul (KR)

(73) Assignees: Hyundai Motor Company, Seoul (KR);
Kia Motors Corporation, Seoul (KR);
Daesung Electric Co., Ltd., Ansan, Gyeonggi-Do (KR)

( * ) Notice: Subject to any disclaimer, the term of this patent is extended or adjusted under 35 U.S.C. 154(b) by 242 days.

(21) Appl. No.: 13/248,201

(22) Filed: Sep. 29, 2011

(65) Prior Publication Data

US 2012/0097508 A1    Apr. 26, 2012

(30) Foreign Application Priority Data

Oct. 25, 2010  (KR) .................. 10-2010-0103813

(51) Int. Cl.
*H01H 3/04*    (2006.01)

(52) U.S. Cl.
USPC .............. 200/61.27; 200/61.28; 200/18

(58) Field of Classification Search
None
See application file for complete search history.

(56) References Cited

U.S. PATENT DOCUMENTS

| | | | |
|---|---|---|---|
| 4,408,104 A | | 10/1983 | Iwata et al. |
| 6,150,620 A | * | 11/2000 | Luley et al. ............... 200/61.27 |
| 6,160,226 A | * | 12/2000 | Garin et al. ................. 200/18 |
| 6,670,564 B2 | * | 12/2003 | Naito et al. ............... 200/61.54 |
| 6,781,072 B2 | * | 8/2004 | Uchiyama et al. ......... 200/61.54 |
| 7,019,226 B2 | * | 3/2006 | Otani et al. ................. 200/16 D |
| 2008/0100139 A1 | * | 5/2008 | Michiyama et al. ......... 307/10.8 |
| 2008/0237009 A1 | * | 10/2008 | Weisz-Margulescu et al. ........................ 200/302.1 |

FOREIGN PATENT DOCUMENTS

| | | | |
|---|---|---|---|
| JP | 2002352673 A | 12/2002 | |
| JP | 2003162943 A | 6/2003 | |

* cited by examiner

*Primary Examiner* — Renee S Luebke
*Assistant Examiner* — Ahmed Saeed
(74) *Attorney, Agent, or Firm* — Edwards Wildman Palmer LLP; Peter F. Corless

(57) ABSTRACT

The present invention relates to a multifunction switch for a vehicle and provides a multifunction switch for a vehicle in which a user may clearly and intuitively distinguish and recognize a rotating knob on a multifunction switch lever and an operating region of a corresponding rotation knob/mechanism which includes a symbol indicating a manipulating position of the rotating knob and which may enhance visibility that distinguishes respective operating regions of the multifunction switch lever and user convenience thereof. The multifunction switch includes a multifunction switch lever, a rotating knob mounted on the multifunction switch lever, and a lighting module for emitting light to the outside along an interface between a rotating knob operating region including a region where symbols indicating a rotating knob and an operating position of the rotating knob are marked and the rest of the operating regions adjacent to the rotating knob operating region.

12 Claims, 8 Drawing Sheets

MULTIFUNCTION SWITCH FOR VEHICLE HAVING LIGHTING MODULE

CROSS-REFERENCE TO RELATED APPLICATION

This application claims under 35 U.S.C. §119(a) the benefit of Korean Patent Application No. 10-2010-0103813 filed Oct. 25, 2010, the entire contents of which are incorporated herein by reference.

BACKGROUND (a) Technical Field

The present invention relates to a multifunction switch for a vehicle. More particularly, it relates to a multifunction switch for a vehicle in which a user may clearly and intuitively distinguish and recognize a rotating knob on a multifunction switch lever and an operating region of a corresponding rotation knob/mechanism which includes a symbol indicating a manipulating position of the rotating knob and which may enhance visibility that distinguishes respective operating regions of the multifunction switch lever and user convenience thereof.

(b) Background Art

In general, a multifunction switch for a vehicle is coupled with a steering column below a steering wheel and includes a body on which a cancel cam and a horn are mounted. Additionally, switch levers are typically provided to right and left sides of the multifunction switch.

A conventional multifunction switch includes various switches and structures required to drive a vehicle. Some of the principal functions of the multifunction switch include a light switch for turning on interior and exterior lights, a turn signal switch, a wiper switch, a windshield washer fluid switch and an intermittent windshield wiper switch.

FIG. 1 is a view illustrating an example of an existing multifunction switch. As illustrated, a multifunction switch illustratively includes two multifunction switch levers 10 and 20 having a plurality of switches for activating and controlling, for example, lamps/headlights, wipers and a windshield washer fluid spraying function of a vehicle. The multifunction switch also includes a body 30 on which the multifunction switch levers 10 and 20 sit. This body 30 allows the multifunction switch to be coupled with a steering column.

The multifunction switch levers 10 and 20 are classified as a left-side multifunction switch lever 10 having switching functions associated with lighting and a right-side multifunction switch lever 20 having switching functions associated with wiping.

The left-side multifunction switch lever 10 and the right-side multifunction switch lever 20 include pivot levers 11 and 21 rotatably coupled with the body 30 and rotating knobs 12, 13, 22, and 23 rotatably coupled with the pivot levers 11 and 21, respectively, wherein the pivot levers 11 and 21 are rotated about a hinged portion with the body 30 by a user and the rotating knobs 12, 13, 22, and 23 are rotated around the respective levers 10 and 20 by fingers of the user.

A plurality of rotating knobs 12, 13, 22, and 23 may be installed to expand switching functions of the levers 11 and 21 and to rotate at sides and ends of the levers 11 and 21.

The body 30 also includes a plurality of moving contacts and fixed contacts which are connected to switches provided in the multifunction switch levers 10 and 20 and connectors 31 for transmitting signals generated by manipulating the multifunction switch levers 10 and 20 to respective parts of a vehicle.

FIGS. 2A-B is a view illustrating examples of a left-side lever and a right-side lever of the multifunction switch, wherein FIG. 2A shows a left-side multifunction switch lever 10 including switches associated with lighting and FIG. 2B shows the right-side multifunction switch lever 20 including switches associated with wiping.

In particular, the left-side multifunction switch lever 10 is configured to select functions of turning on/off headlamps (low beam and high beam headlamps), turn signal lamps, tail lamps, and fog lamps and an automatic mode (provided to a vehicle to which an automatic light system is applied) by manipulating the pivot lever 11 or the rotating knobs 12 and 13.

As illustrated, the rotating knob of the left-side multifunction switch lever 10 includes an intermittent knob 12 rotated at an intermittent portion of the pivot lever 11 and an end knob 13 coupled with a leading end of the pivot lever 11 and is configured to turn on/off the headlamps (high beam headlamps/low beam headlamps) and to control a projection direction of the headlamps by rotating the end knob 13 and to select the automatic mode 'AUTO' of the automatic light system. Furthermore, when the intermittent knob 12 is rotated, the fog lamps (front fog lamps/rear fog lamps) may be turned on/off.

The right-side multifunction switch lever 20 is configured to select functions of turning on/off and controlling of speed of a windshield wiper and of spraying windshield washer fluid by pivoting the pivot lever 21 and rotating the rotating knobs (or mechanisms) 22 and 23.

As illustrated, the right-side multifunction switch lever 20 also includes an intermittent knob 22 rotated an intermittent knob 22 rotated at an intermittent portion of the pivot lever 21 and an end knob 23 coupled with a leading end of the pivot lever 21. The end knob 23 provides switching functions of driving a rear wiper of a rear windshield and spraying windshield washer fluid on a rear windshield glass. The pivot lever 21 and the intermittent knob 22 provide switching functions of controlling the front windshield wipers of a front windshield and spraying windshield washer fluid onto a front windshield glass.

When the pivot lever 21 of the right-side multifunction switch lever 20 is moved forward and rearward (i.e., toward the driver and away from the driver respectively), front and rear washer fluid sprays may be controlled. When the pivot lever 21 is moved upward and downward (i.e., toward the ceiling and toward the floor of the vehicle of the car respectively), the front wipers may be controlled in modes of turning off 'OFF', being driven at high speed 'HI', low speed 'LO', and automatically 'AUTO'.

The intermittent knob 22 is rotated to control the driving speed of the front windshield wipers and the end knob 23 is rotated to select the functions of turning on 'ON', off 'OFF', and driving intermittently 'INT' the rear windshield wiper.

However, in the multifunction switch, since the levers, that is, the left-side multifunction switch lever 10 and the right-side multifunction switch lever 20 include many switches, the manipulation of the levers can be very difficult and a user may have trouble precisely understanding and using the functions of the respective switches.

As stated above, typical multifunction switch levers have various manipulations such as upward and downward pivoting and forward and rearward pivoting of the pivot levers and rotations of the rotating knobs that are applied to the left-side multifunction switch lever and the right-side multifunction switch lever. However, since many switches are collected into a small multifunction switch lever and the rotating knobs include a plurality of knobs such as the end knobs and the intermittent knobs, the manipulations of the multifunction switch levers can become very complicated to some users.

In practice, user complaints in association with the windshield wipers of a vehicle are mostly about manipulations of the windshield wipers, that is, inconvenience caused by complicated manipulations of the levers described above due to the difficulty of understanding of the multifunction switches rather than wiping performance and attachment/detachment of the windshield wipers.

Moreover, in the multifunction switch on which the intermittent knobs and the end knobs are mounted, it is difficult to distinguish operating regions of the intermittent knobs and the end knobs.

For example, as illustrated in FIG. 2A, although the intermittent knob 12 for operating front and rear fog lamps and the end knob 13 for operating the turning on/off and operating modes of the headlamps are mounted on the left-side multifunction switch lever 10, poor visibility of distinguishing the operating regions of the two knobs, that is, symbols indicating the operating positions has a certain degree of inconvenience and difficulty.

In a vehicle to which a front windshield wipers and a rear windshield wiper are mounted, as illustrated in FIG. 2B, since the intermittent knob 22 for controlling speed of the front windshield wipers and the end knob 23 for operating the rear windshield wiper are mounted on the right-side multifunction switch lever 20, poor visibility of distinguishing the operating regions of the two knobs, that is, symbols indicating the operating positions again has certain degree of inconvenience and difficulty.

Therefore, a multifunction switch in which a user can clearly and easily distinguishing the operating regions of the switches would be greatly beneficial to drivers.

SUMMARY OF THE DISCLOSURE

The present invention provides a multifunction switch for a vehicle in which a user may clearly and intuitively distinguish and recognize a rotating knob on a multifunction switch lever and an operating region of a corresponding rotation knob which includes a symbol indicating a manipulating position of the rotating knob and visibly distinguish respective operating regions of the multifunction switch lever, and thereby enhances user convenience thereof.

In one aspect, the present invention which includes a multifunction switch lever, a rotating knob mounted on the multifunction switch lever, and a lighting module. In particular, the light module emits light to the outside along an interface between a rotating knob operating region. This region includes a region where symbols indicate a rotating knob and an operating position of the rotating knob that are marked and the rest of the operating regions which are adjacent to the rotating knob operating region.

The multifunction switch further includes a lighting module for emitting light along an interface between an end knob operating region including an end knob installed on an end of the multifunction switch lever and a symbol indicating an operating position of the end knob and the rest of the operating regions adjacent to the end knob operating region.

Furthermore, the multifunction switch lever of the present invention may also have an intermittent knob. In this case, the lighting module emits light along an interface between the end knob operating region and an intermittent knob operating region including the intermittent knob and a symbol indicating an operating position of the intermittent knob.

More specifically, the lighting module of the present invention may include a light source, a PCB to which the light source is connected, and a plate-shaped lens coupled with the light source to diffuse light emitted from the light source laterally, wherein a circumference of the lens is exposed to the outside along the interface of a lateral side of the multifunction switch lever when the light source, the PCB, and the lens are assembled in the multifunction switch lever.

The PCB and the lens can be coupled with a fixed bar installed in the multifunction switch lever. The fixed bar may be made in the form of a pipe having an open side cut off in the longitudinal direction. In this case, PCB and the fixed bar may then be coupled with each other by inserting the fixed bar into a through-hole formed in the PCB.

The lens may have a seat formed in a side thereof such that the light source is inserted into and sits on the seat such that light emitted from the inserted light source is diffused laterally along the lens. Illustratively, the lens may be assembled to the fixed bar such that the seat and the light source are inserted into the fixed bar through a cut-off portion of the fixed bar.

Advantageously, the multifunction switch levers include lighting modules for emitting strap-shaped light beams along the interfaces between the rotating knob operating regions (including the respective knobs and the corresponding symbols) on the lateral sides of the multifunction switch levers, so that a user may intuitively and clearly distinguish and recognize the operating regions associated with corresponding rotating knobs of the multifunction switch levers thus enhancing visibility and user convenience. Furthermore, the strap-shaped light beams realized on the lateral sides of the multifunction switch levers by the lighting modules serve as a mood-lighting so that driver relaxation may be improved.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

The terms used hereinbelow are used to explain a specific embodiment of the present invention and are not intended to limit the scope of the present invention. In the description of the embodiment of the present invention, repeated explanation of the same parts as in a well-known technology is omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, an exemplary embodiment of the present invention will be described below in detail with reference to the accompanying drawings such that those skilled in the art to which the present invention pertains can easily practice the present invention.

The present invention relates to a multifunction switch for a vehicle. More particularly a multifunction switch lever includes a lighting module for distinguishing operating regions of a rotating knob.

Figure 1:
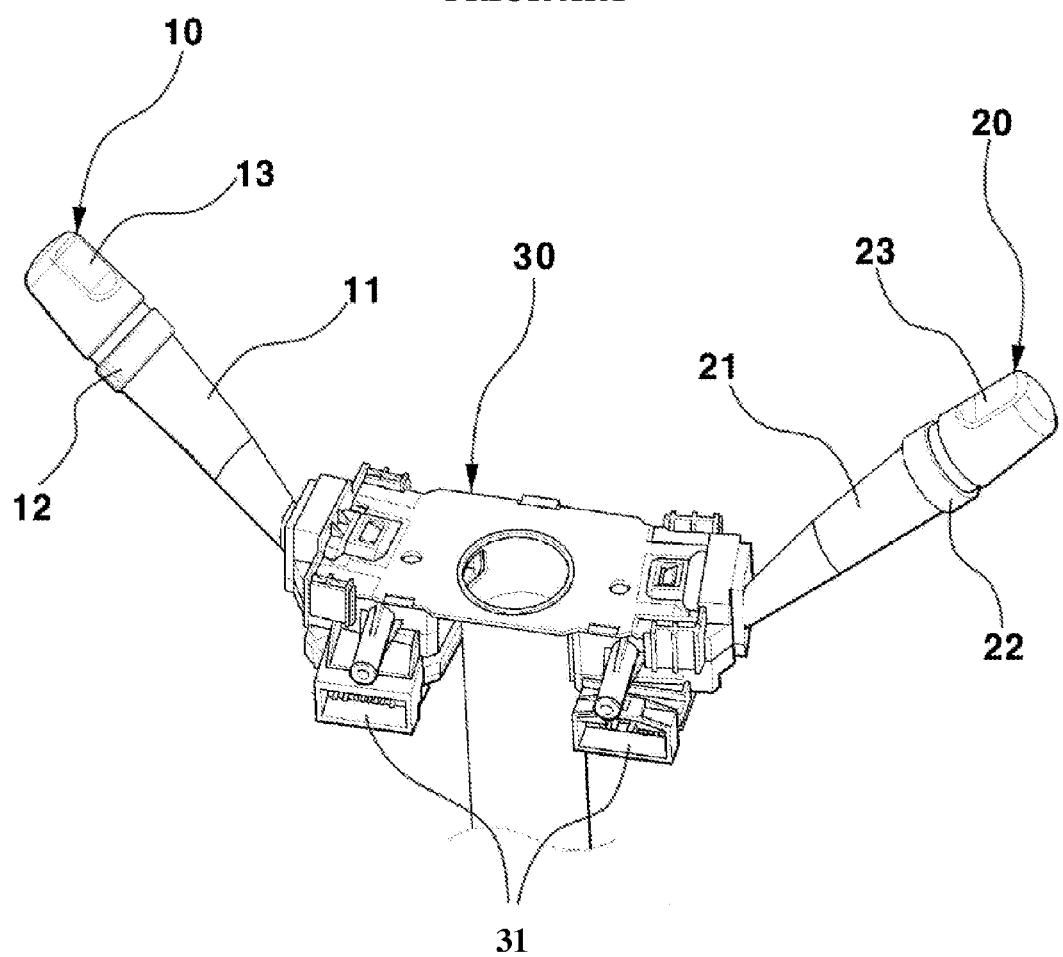
FIG. 1 is a view illustrating an example of an existing multifunction switch.
Figure 2A:
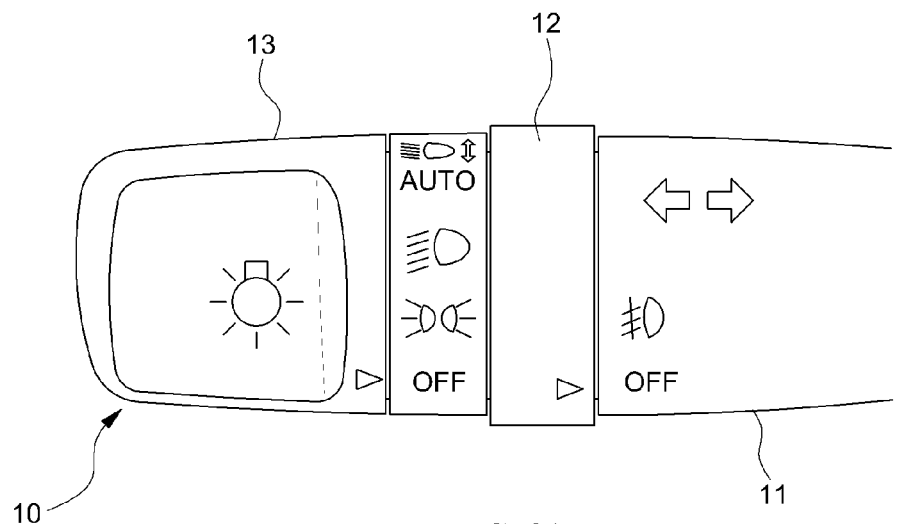
FIGS. 2A-B is a view illustrating examples of a left-side multifunction switch lever and a right-side multifunction switch of the existing multifunction switch.
Figure 2B:
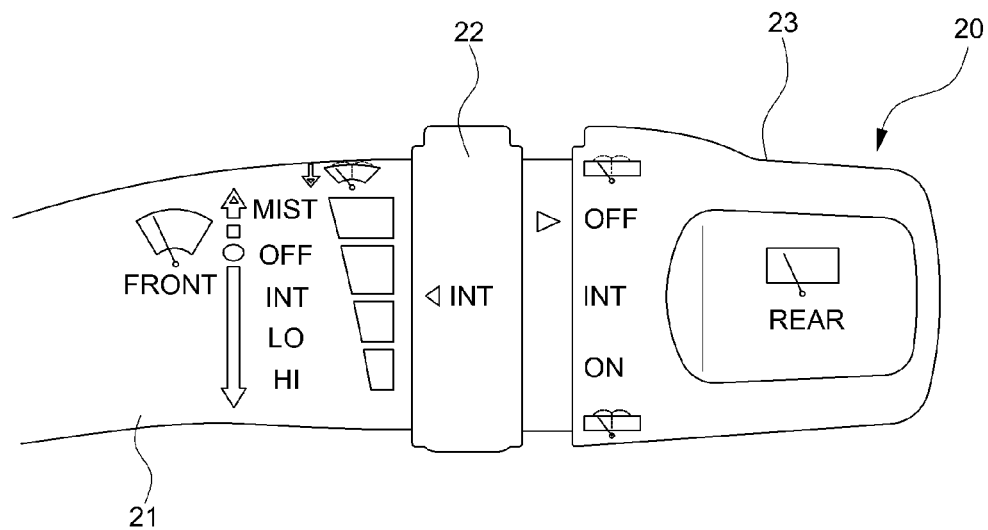
Figure 3:
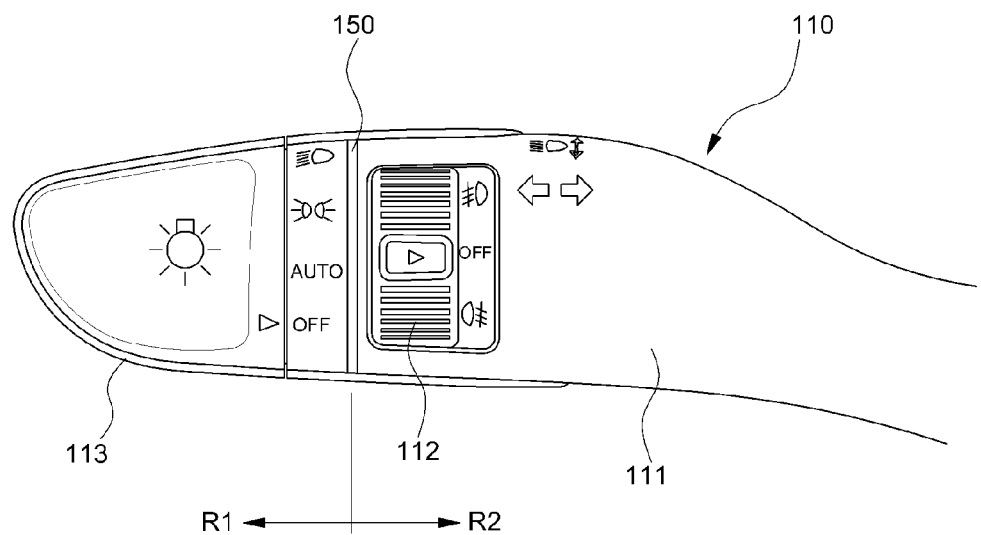
FIGS. 3 and 4 are views illustrating multifunction switch levers of a multifunction switch according to an exemplary embodiment of the present invention.
Figure 4:
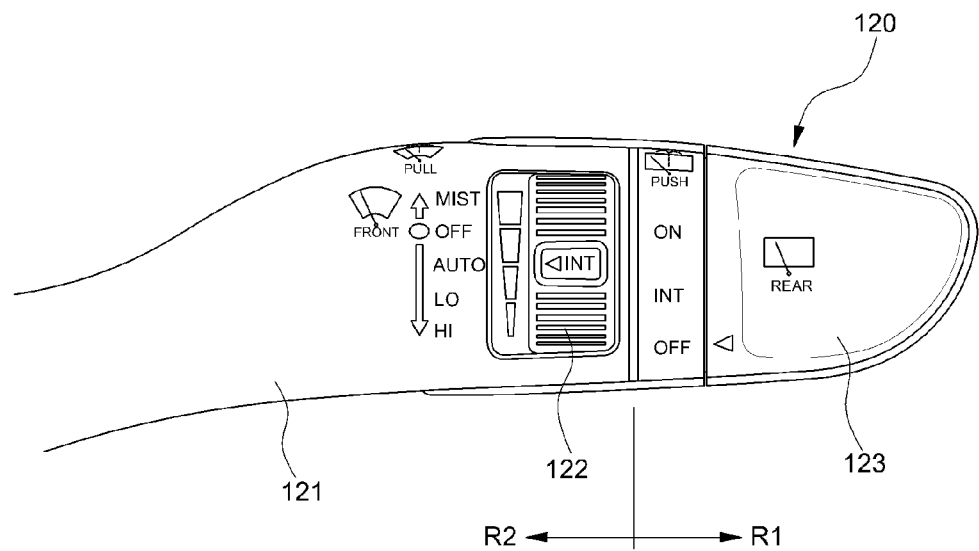

FIGS. 3 and 4 are views illustrating multifunction switch levers of a multifunction switch according to an illustrative embodiment of the present invention. FIG. 3 illustrates a left-side multifunction switch lever 110 having a switching function for operating headlamps, turn signal lamps, tail lamps, and fog lamps and FIG. 4 illustrates a right-side multifunction switch lever 120 having a switching function for operating windshield wipers and a washer fluid spray.

In the multifunction switch according to the illustrative embodiment of the present invention, the multifunction switch levers 110 and 120, that is, the left-side multifunction switch lever 110 and the right-side multifunction switch lever 120 have a configuration that is somewhat similar to those of multifunction switch levers of an existing multifunction switch, however, in particular the present invention includes a lighting module 150 for distinguishing operating regions of rotating knobs 112, 113, 122, and 123.

For example, in the multifunction switch levers of the multifunction switch according to the illustrative embodiment of the present invention, the rotation knobs of the left-side multifunction switch lever 110 include an intermittent knob 112 having a switching function for operating the fog lamps and an end knob 113 having a switching function of operating the headlamps and an automatic mode 'AUTO'. The rotating knobs of the right-side multifunction switch lever 120 include an intermittent knob 122 having a switching function for controlling a speed of the front windshield wipers and an end knob 123 having a switching function for operating the rear windshield wiper.

The lighting module 150 is provided to visually distinguish the operating regions of the rotating knobs 112, 113, 122, and 123. That is, as illustrated in FIGS. 3 and 4, when a region R1 indicated by symbols (characters or pictures) indicating the end knobs 113 and 123 and the operating positions thereof is defined as an end knob operating region in the multifunction switch levers 110 and 120, the lighting module 150 is installed to provide improved visibility by distinguishing the end knob operating region R1 from the other operating region R2 via a light. Furthermore, a lens 153 (shown in FIG. 7) has a circumference exposed to the outside as will be described in the following description of the lighting module 150.

In the multifunction switch levers 110 and 120 in which the intermittent knobs 112 and 122 and the end knobs 113 and 123 are installed, the lighting module 150 may be installed to distinguish an intermittent knob operating region R2, which includes the intermittent knobs 112 and 122 and the operating positions of the intermittent knobs 112 and 122, from the end knob operating region R1 which includes the end knobs 113 and 123 and the regions where the symbols are marked by light.

As such, the lighting modules 150 are installed to emit light along an interface between the operating regions R1 and R2 of the rotating knobs such as the intermittent knobs and the end knobs which are adjacent to each other so that the respective operating regions R1 and R2 may be visually distinguished and recognized through the use of lighting modules 150.

The lighting module 150 may be provided to be turned on with the tail lamps by an external power applied by a controller under a preset turning-on condition when manipulating a tail lamp switch.

For example, in a vehicle to which an automatic light system is applied, since the controller of the vehicle controls the headlamps and/or the tail lamps based on a signal input from a light sensor, the controller may be configured to turn on/off the lighting module 150 based on a signal from the light sensor at night or when entering a tunnel.

Figure 5:
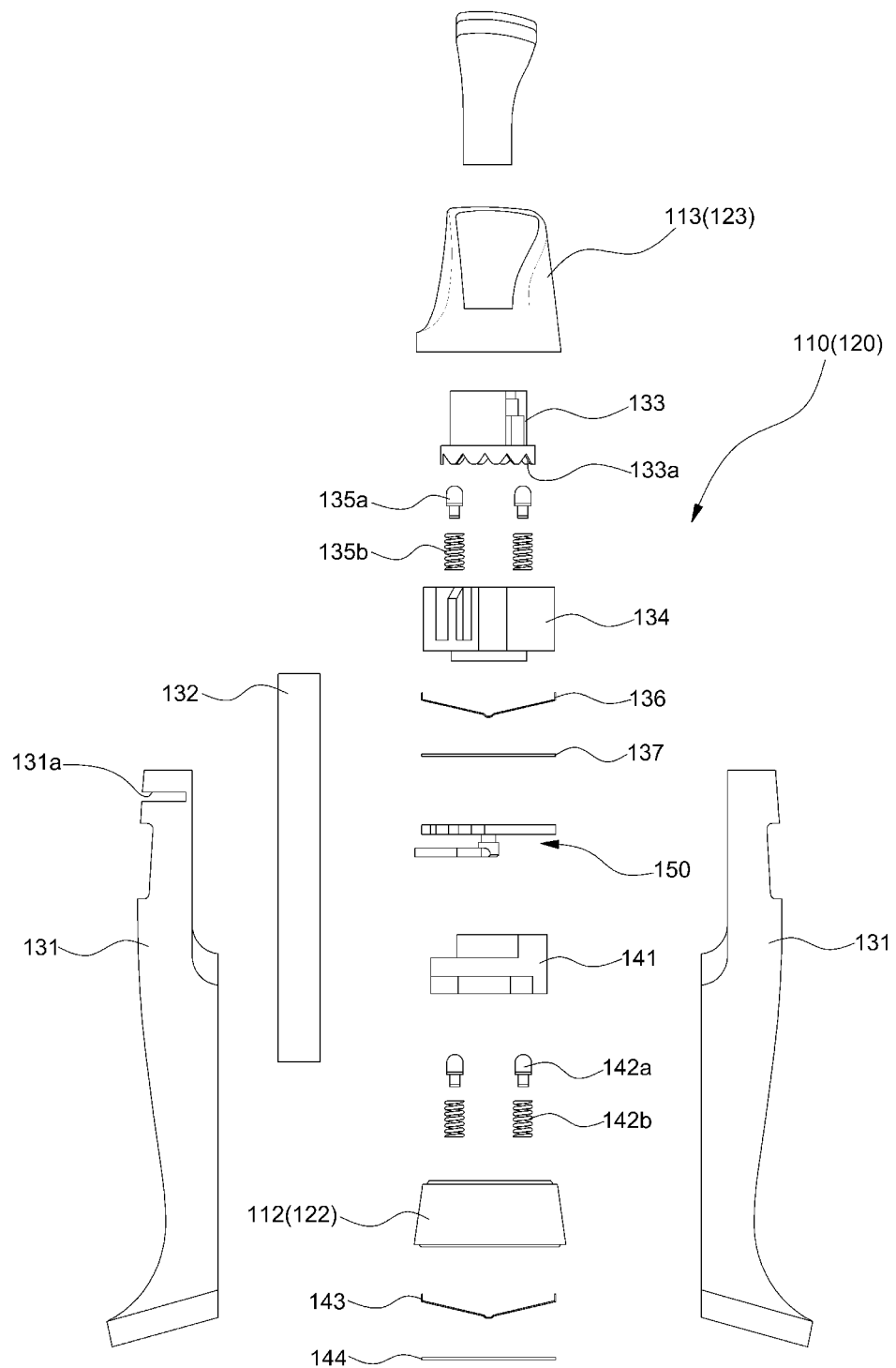
FIG. 5 is an exploded view illustrating the multifunction switch lever, of the multifunction switch according to the exemplary embodiment of the present invention, including a lighting module.
Figure 6:
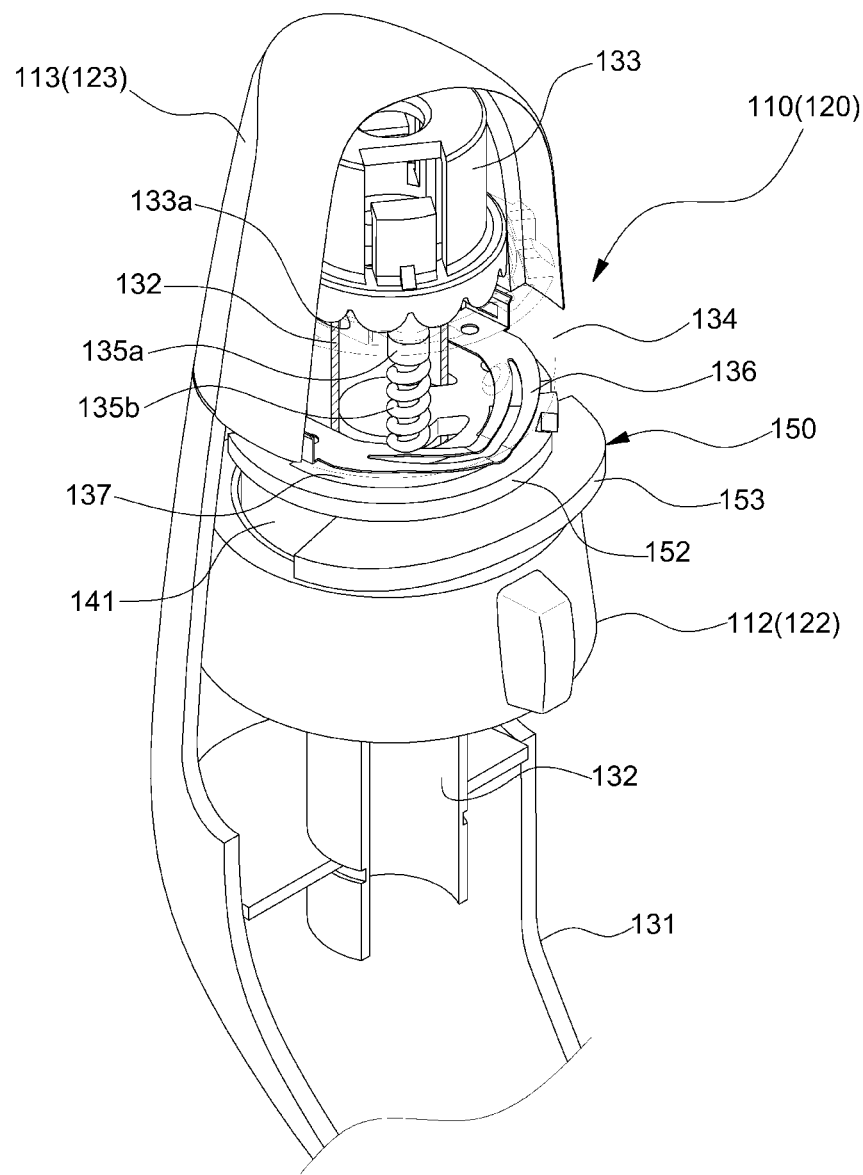
FIG. 6 is a perspective view illustrating configuration and installation of the lighting module of the multifunction switch according to the exemplary embodiment of the present invention.
Figure 7:
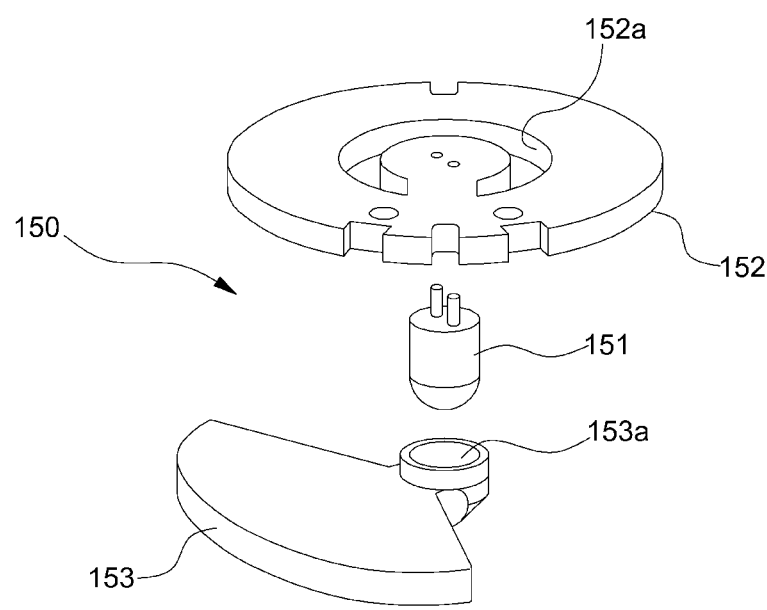
FIG. 7 is an exploded perspective view illustrating the lighting module of the multifunction switch according to the exemplary embodiment of the present invention.
Figure 8:
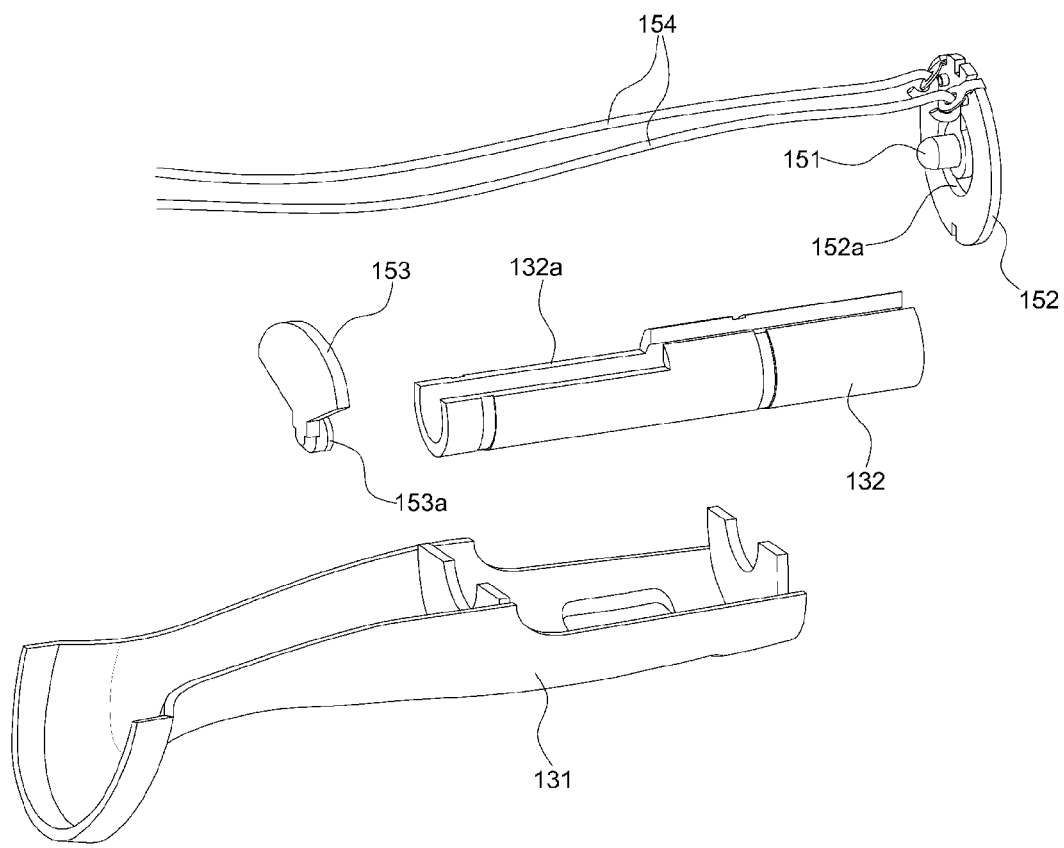
FIGS. 8 and 9 are views illustrating installation of the lighting module of the multifunction switch according to the exemplary embodiment of the present invention.
Figure 9:
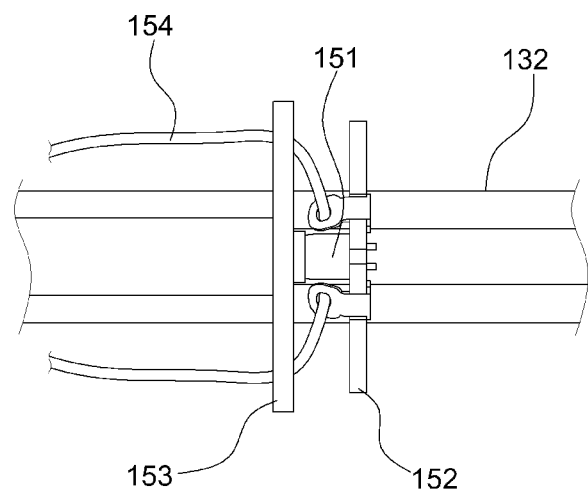

FIG. 5 is an exploded view illustrating the multifunction switch lever, of the multifunction switch according to the illustrative embodiment of the present invention, which includes a lighting module. FIG. 6 is a perspective view illustrating configuration and installation of the lighting module of the multifunction switch according to the illustrative embodiment of the present invention. FIG. 7 is an exploded perspective view illustrating only the lighting module of the multifunction switch according to the illustrative embodiment of the present invention. FIGS. 8 and 9 are views illustrating installation of the lighting module of the multifunction switch according to the illustrative embodiment of the present invention.

For reference, parts installed in the multifunction switch levers 110 and 120 with the lighting modules 150 are separated in FIG. 5, a part of a fixed bar 132 is cut off in order to clearly show the interior of the multifunction switch levers 110 and 120 wherein the cut-off portions are hatched.

A moving block 134 of FIG. 5, in order to show the interior clearly, is depicted only by outlines. FIG. 8 shows a lever case 131, a fixed bar 132, and a lens 153, a light source 151, and a PCB 152 of the lighting module which are separated from each other. FIG. 9 shows a side structure of the installation of the lighting module 150 to the fixed bar 132.

In the multifunction switch according to the embodiment of the present invention, the multifunction switch levers 110 and 120 includes, as illustrated in FIG. 5, a plurality of parts assembled into the lever cases 131 of the levers 110 and 120 and rotating knobs installed to be wholly or partially exposed to the outsides of the lever cases 131 and to rotate.

In this case, a plurality of rotating knobs such as end knobs 113 and 123 rotatably coupled to ends of the levers 110 and 120 and intermittent knobs 112 and 122 which are rotatably coupled to sides of the levers 110 and 120 are installed in the levers 110 and 120.

Furthermore, the lighting module 150 is further installed to emit light through the interfaces between the rotating knob (end knob) operating regions and the other operating regions. This lighting module 150 is inserted into the fixed bars 132 within the lever cases 131.

The parts assembled into each of the levers 110 and 120 includes a fixed long bar 132 fixed within a lever cases 131 in the longitudinal direction, a first stator 133, a moving block 134, a first slide pins 135a, first springs 135b for providing an elastic force to the first slide pins 135a, a first contactor 136, a first contact plate 137, a second stator 141, second slide pins 142a, second springs 142b for providing an elastic force to the second slide pins 142a, a second contactor 143, and a second contact plate 144.

The first stator 133, the moving block 134, the first slide pin 135a and the spring 135b, the first contactor 136, and the first contact plate 137 relate to operation of the end knobs 113 and 123. The second stator 141, the second slide pins 142a and the second springs 142b, the second contactor 143, and the second contact plate 144 relate to operation of the intermittent knobs 112 and 122.

The above-mentioned parts are inserted into the fixed bar 132 that is installed within the lever case 131 of each of the levers 110 and 120. The fixed bar 132 passes through all the respective parts except the slide pins 135a and 142a and the springs 135b and 142b from the second contact plate 144 the lowermost part of FIG. 5 to the uppermost first stator 133. In this case, some of the parts are fixed to the fixed bar 132 and the rest of the parts are installed to rotate around the fixed bar 132.

That is, the moving block 134 and the first contactor 136 are rotatably coupled on the fixed bar 132 and are rotated with the end knobs 113 and 123 in association with the rotation of the end knobs 113 and 123. The first stator 133 and the first contact plate 137 (integrated with later-described PCB of the lighting module) are integrally fixed to the fixed bar 132 so that they cannot not be rotated within the lever case 131.

The second contactor 143 rotates with the intermittent knobs 112 and 122 in association with rotation of the intermittent knobs 112 and 122 and the second stator 141 and the second contact plate 144 are integrally fixed to the fixed bar 132 so that they cannot to be rotated within the lever case 131.

The first stator 133 and the moving block 134 of the multifunction switch of each of the levers 110 and 120 are inserted into the end knobs 113 and 123 wherein the first stator 133 is inserted into and fixed to the end of the fixed bar 132. The moving block 134 is rotatably inserted into and coupled with the fixed bar 132 to be rotated with the end knobs 113 and 123.

The fixed parts the first stator 133 and the moving parts the first slide pin 135a and the first spring 135b provide a shift feel during the rotation of the end knobs 113 and 123. Since the first slide pins 135a are coupled with the first springs 135b and the first springs 135b are inserted into the moving block 134, the first slide pins 135a and the first springs 135b move together during the rotation of the moving block 134.

Each of the first stator 133 has ratchets and recesses 133a repeatedly formed on the circumference of a surface facing the moving block 134 and each of the first slide pins 135a contacts closely to the ratchets and recesses 133a of the first stators 133 when being elastically supported by the first springs 135b.

By doing so, when the end knobs 113 and 123 are rotated, the first slide pins 135b elastically supported by the first springs 135b move while maintaining a close contacting state against the ratchets and recesses 133a of the first stator 133 simultaneously with the rotation of the moving block 134.

Thus, when a user rotates the end knobs 113 and 123, the moving blocks 134 are rotated and at this time the first springs 135b are compressed and restored repeatedly and the first slide pins 135a move along the ratchets and recesses 133a while closely contacting against the same. Therefore, the first slide pins 135a repeatedly pass the ratchets and recesses whenever the end knobs and their associated moving blocks are rotated so that a user may experience the shift feel at every preset angle.

The first contactor 136 and the first contact plate 137 serve as switching contacts which are closed and open by rotating the end knobs 113 and 123. The first contactor 136 are rotatably inserted into the fixed bar 132 to be rotated with the moving block 134.

The first contact plate 137 is formed on the surface of the PCB 152 of the lighting module 150 in the form of a terminal plate. When the first contactor 136 is rotated with the moving block 134 on the first contact plate 137 by rotating the end knobs 113 and 123, contact corresponding to manipulating positions of the end knobs 113 and 123 is formed between the first contactors 136 and the first contact plate 137 is closed and opened according to the manipulating positions of the end knobs 113 and 123 and the rotation positions of the moving blocks 134 and the first contactor 136 corresponding to the manipulating positions of the end knobs 113 and 123. When the contact is formed at the manipulating positions of the end knobs 113 and 123 between the first contactor 136 and the first contact plate 137, the first contact plate 137 may output a switching signal corresponding to the manipulating positions of the end knobs 113 and 123 through corresponding contacts.

The second stator 141 of each of the multifunction switch levers 110 and 120 is inserted into the fixed bar 132 to be integrally fixed without rotation and the intermittent knobs 112 and 122 are coupled with the second stator 141 by the second slide pins 142a and the second springs 142b.

The intermittent knobs 112 and 122 are each rotatably inserted into their respective fixed bar 132 and some of the intermittent knobs 112 and 122 are exposed to the outside through side holes formed in the lever case when the intermittent knobs 112 and 122 are inserted into their respective lever cases 131. Thus, a user may rotate the intermittent knobs 112 and 122 using the portions exposed to the outside from the sides of the multifunction switch levers.

The fixed part the second stator 141 and the moving parts the second slide pins 142a and the second springs 142b provide a shift feel during the rotation of the intermittent knobs 112 and 122. Since the second slide pins 142a are coupled with the second springs 142b and the second springs 142b are inserted into the intermittent knobs 112 and 122, the second slide pins 142a and the second springs 142b move together during the rotation of the intermittent knobs 112 and 122.

Each second stator 141 in the respective levers 110 and 120 has ratchets and recesses 141a which are repeatedly formed on the circumference of a surface facing the intermittent knobs 112 and 122 and each of the second slide pins 142a is in close contact to the ratchets and recesses 141a of the second stator 141 when being elastically supported by the second springs 142b.

By doing so, when the intermittent knobs 112 and 122 are rotated, the second slide pins 142a elastically supported by the second springs 142b move while maintaining a close contact state against the ratchets and recesses 141a of the second stator 141.

Thus, when a user rotates the intermittent knobs 112 and 122, the second springs 142b are compressed and restored repeatedly and at the same time the second slide pins 142a move along the ratchets and recesses 141a while closely contacting against the same. Therefore, the second slide pins 142a repeatedly pass the ratchets and recesses whenever the intermittent knobs 112 and 122 are rotated so that a user may experience the shift feel at every preset angle.

The second contactor 143 and the second contact plate 144 serve as a switching contact of which are closed and opened by rotating the intermittent knobs 112 and 122. The second contactor 143, like in the first contactor 136, are rotatably inserted into the fixed bar 132 to be rotated with the intermittent knobs 112 and 122.

The second contact plate 144 is inserted into and integrally fixed to the fixed bar 132 so that it cannot be rotated. When the second contactor 143 is rotated on the second contact plate 144 by rotating the intermittent knobs 112 and 122, contact corresponding to manipulating positions of the intermittent knobs 112 and 122 is formed between the second contactor 143 and the second contact plate 144.

That is, contact between the second contactor 143 and the second contact plate 144 is closed and opened according to the manipulating positions of each of the intermittent knobs 112 and 122 respectively. When the contact are formed at the manipulating positions of the intermittent knobs 112 and 122 between the second contactor 143 and the second contact plate 144, the second contact plate 144 may a output switching signal corresponding to the manipulating positions of the intermittent knobs 112 and 122 through their corresponding contacts.

The lighting module 150 of the multifunction switch levers 110 and 120 are configured to emit light along the interfaces between the two adjacent operating regions, particularly between the end knob operating regions R1 and the rest of the operating regions R2 as illustrated in FIGS. 3 and 4.

The interfaces (where the lenses 153 of the lighting modules 150 are positioned) between the end knob operating regions R1 and the rest of the operating regions R2 become an interface distinguishing a headlamp operating region and a fog lamp operating region in the left-side multifunction switch lever and become an interface distinguishing a rear windshield wiper operating region and a front windshield wiper operating region in the right-side multifunction switch lever.

That is, in the left-side multifunction switch lever 110 of FIG. 3, the headlamp operating region becomes the end knob operating region R1 and the fog lamp operating region becomes the intermittent knob operating region R2 adjacent to the end knob operating region R1 by interposing the interface.

In the right-side multifunction switch lever 120 of FIG. 4, the rear windshield wiper operating region becomes the end knob operating region R1 and the front windshield wiper operating region becomes the intermittent knob operating region R2 adjacent to the end knob operating region R1 by interposing the interface.

Therefore, the lighting modules 150 installed to be exposed to the outside along the interfaces are provided to emit that strap-shaped light beam along the interfaces so that the strap-shaped light beams emitted from the interfaces may clearly distinguish the two operating regions adjacent to each other.

In an existing multifunction switch, since the headlamp operating region and the fog lamp operating region are provided on a single multifunction switch lever (left-side multifunction switch lever) and the rear windshield wiper operating region and the front windshield wiper operating region are provided to a single multifunction switch lever (right-side multifunction switch lever), it is difficult and inconvenient to distinguish the switches corresponding to the headlamps and the fog lamps and the rear windshield wiper and the front windshield wipers. However, in the present invention, the strap-shaped light beams are emitted between the adjacent end knob operating regions R1 and the intermittent knob operating regions R2 by the lighting modules 150 so that the respective operating regions may be intuitively distinguished and recognized, thereby improving visibility and user convenience. Since the strap-shaped light beams serve as a light, productivity may be also enhanced.

The configuration and the installation of the lighting modules will be described in detail with reference to FIGS. 6 to 9.

As illustrated, each of the lighting modules 150 includes a light source 151, a PCB 152 to which the light source 151 is electrically connected and fixed, and a lens 153 for absorbing light emitted from the light source 151 and for emitting the light.

The light source 151 may be an LED having a semi-permanent lifespan, a wire 154 may be connected to a connector terminal 155 for the supply of electric power, and the light source 151 is turned on when the electric power is supplied through the wire 154 and the PCB 152.

The lens 153 may be a plate having a seat 153a into which the light source 151 is inserted and sits. When the light source 151 is inserted into the seat 153a and the light source 151 is turned on, light emitted from the light source 151 is diffused laterally along the lens 153.

The circumferences of the lenses 153 become surfaces exposed along the interfaces between rotating knob operating regions (end knob operating regions) R1 and the rest of the operating regions (intermittent knob operating regions) R2 adjacent thereto from the lateral sides of the lever cases 131 of the multifunction switch levers 110 and 120 (See FIGS. 3 and 4). The lens 153 are configured to be exposed to the outside through lens hole (indicated by reference numeral 131a in FIG. 5) formed at the lateral sides of each of the lever cases 131 along the interfaces.

As such, since the circumferences of the lenses 153 are exposed to the outside along the interfaces between the operating regions R1 and R2, the light emitted from the light sources 151 when the light sources 151 are turned on is laterally diffused and emitted along the interfaces. Therefore, the strap-shaped light distinguishing the two rotating knobs 112, 113, 122, and 123 is implemented along the interfaces of the lateral sides of the multifunction switch levers 110 and 120.

The lighting module 150 is disposed between the moving block 134 to which the first contactor 136 is fixed and the second stator 141 within the multifunction switch levers 110 and 120 by being inserted into the fixed bar 132 disposed in each of the levers 110 and 120.

In more detail, as illustrated in FIG. 8, the fixed bar 132 is formed by a pipe having an open side cut off in the longitudinal direction. The PCB 152 has a through-hole 152a so that the fixed bar 132 can be inserted into the through-hole 152a for coupling with the PCB 152.

Each lens 153 has an overall fan-shape and is assembled such that the light source 151 and the seat 153a are inserted into the fixed bar 132. As such, when the light sources 151 and the seats 153a are positioned in the fixed bar 132, the fixed bar 132 serves as a cover surrounding the light sources and blocks light emitted from the light sources to prevent light emitted from the light sources 151 from being leaked toward the ambient of the lens 153. Thus, more intensive light may be transmitted to the lens 153.

As such, the multifunction switch according to the illustrative embodiment of the present invention, particularly the multifunction switch levers 110 and 120 having lighting modules 150, have been described in detail. The strap-shaped light beams distinguishing the operating regions along the interfaces between the adjacent knob operating regions (including the respective knobs and the corresponding symbols indicating the knobs) R1 and R2 on the lateral sides of the multifunction switch levers 110 and 120 may be realized, so that the respective operating regions may be intuitively distinguished and recognized by the strap-shaped light beams and that visibility and user convenience may be enhanced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A multifunction switch for a vehicle comprising:
   a multifunction switch lever;
   a rotating knob mounted on the multifunction switch lever; and
   a lighting module positioned within the multifunction lever and to emit light to the outside along an interface between a rotating knob operating region including a region where symbols indicate the rotating knob and an operating position of the rotating knob are marked and the rest of the operating regions adjacent to the rotating knob operating region,
   wherein the light module is positioned so that the light emitted from the light module divides the multifunction lever into a rotating knob operating region and a rest of the operating region.

2. The multifunction switch of claim 1, further comprising a second lighting module for emitting light along an interface between an end knob operating region including an end knob installed to an end of the multifunction switch lever and a symbol indicating operating position of the end knob and the rest of the operating regions adjacent to the end knob operating region.

3. The multifunction switch of claim 2, wherein the multifunction switch lever comprises an intermittent knob and the lighting module emits light along an interface between the end knob operating region and an intermittent knob operating region including the intermittent knob and a symbol indicating an operating position of the intermittent knob.

4. The multifunction switch of any one of claim 1, wherein the lighting module comprises:
   a light source;
   a PCB to which the light source is connected; and
   a plate-shaped lens coupled with the light source to diffuse light emitted from the light source laterally,
   wherein a circumference of the lens is exposed to the outside along the interface of a lateral side of the multifunction switch lever when the light source, the PCB, and the lens are assembled in the multifunction switch lever.

5. The multifunction switch of claim 4, wherein the PCB and the lens are coupled with a fixed bar installed in the multifunction switch lever, the fixed bar made in the form of a pipe having an open side cut off in the longitudinal direction, and the PCB and the fixed bar are coupled with each other by inserting the fixed bar into a through-hole formed in the PCB.

6. The multifunction switch of claim 5, wherein the lens has a seat formed in a side thereof such that the light source is inserted into and sits on the seat such that light emitted from the inserted light source is diffused laterally along the lens, and the lens is assembled to the fixed bar such that the seat and the light source are inserted into the fixed bar through the cut-off portion of the fixed bar.

7. A multifunction switch for a vehicle comprising:
   a multifunction switch lever;
   a rotating mechanism mounted on the multifunction switch lever; and
   a lighting module positioned within the multifunction lever and to emit light in to the outside along an interface between a first region and a second region adjacent to the first region, the first region including symbols associated with the rotating mechanism and an operating position of the rotating mechanism, wherein the emitted light is directed along the circumference of a lens installed in the multifunction switch lever,
   wherein the light module is positioned so that the light emitted from the light module divides the multifunction lever into a rotating knob operating region and a rest of the operating region.

8. The multifunction switch of claim 7, further comprising the lighting module is configured to emit light along an interface between a third region a fourth region adjacent to the third region, the third region including an end rotating mechanism installed on an end of the multifunction switch lever and a symbol indicating operating position of the end rotating mechanism.

9. The multifunction switch of claim 8, wherein the multifunction switch lever comprises an intermittent knob and the lighting module emits light along an interface between the end knob operating region and an intermittent knob operating region including the intermittent knob and a symbol indicating an operating position of the intermittent knob.

10. The multifunction switch of any one of claim 7, wherein the lighting module comprises:
    a light source;
    a PCB to which the light source is electrically connected; and
    a plate-shaped lens coupled with the light source to diffuse light emitted from the light source laterally,
    wherein a circumference of the lens is exposed to the outside along the interface of a lateral side of the multifunction switch lever when the light source, the PCB, and the lens are assembled in the multifunction switch lever.

11. The multifunction switch of claim 10, wherein the PCB and the lens are coupled with a fixed bar installed in the multifunction switch lever, the fixed bar made in the form of a pipe having an open side cut off in the longitudinal direction, and the PCB and the fixed bar coupled with each other by inserting the fixed bar into a through-hole formed in the PCB.

12. The multifunction switch of claim 11, wherein the lens has a seat formed in a side thereof such that the light source is inserted into and sits on the seat such that light emitted from the inserted light source is diffused laterally along the lens, and the lens is assembled to the fixed bar such that the seat and the light source are inserted into the fixed bar through the cut-off portion of the fixed bar.

* * * * *